United States Patent [19]

Genbauffe et al.

[11] 4,431,117

[45] Feb. 14, 1984

[54] PROPELLANT STORAGE CONSTRUCTION, PARTS THEREFOR AND METHODS OF MAKING THE SAME

[75] Inventors: Francis S. Genbauffe, Irwin; Joseph J. Erdelsky, Jeannette, both of Pa.; Eugene C. Greenwood, Costa Mesa, Calif.

[73] Assignee: Robertshaw Controls Company, Richmond, Va.

[21] Appl. No.: 328,942

[22] Filed: Dec. 9, 1981

[51] Int. Cl.$^3$ ........................ B67B 7/24; B65D 83/00; F16K 31/12

[52] U.S. Cl. ........................................ 222/3; 222/394; 222/397; 222/399; 137/507; 137/505.39

[58] Field of Search .................. 222/3, 394, 396, 397, 222/399; 137/505.39, 505.41, 505.42, 507

[56] References Cited

U.S. PATENT DOCUMENTS 3,245,583 4/1966 Miller et al. .................... 222/399 X
3,433,389 3/1969 Puster .................................... 222/3
3,749,356 7/1973 Conley ................................ 222/3 X

*Primary Examiner*—Robert B. Reeves
*Assistant Examiner*—Russell D. Stormer
*Attorney, Agent, or Firm*—Candor, Candor & Tassone

[57] ABSTRACT

A propellant storage construction having a chamber for storing propellant and a passage leading to the chamber and containing a valve unit therein for opening and closing the passage, the construction having a removable pressure regulator unit interconnected thereto and being operatively associated with the valve unit for operating the valve unit in relation to the pressure of the propellant having passed through the valve unit. One of the passage and the pressure regulator unit defines a generally conical seat adjacent the valve unit and on the side thereof opposite to the chamber and the other of the passage and the pressure regulator unit having a generally conical nose-like member seated in the seat to fluidly interconnect the pressure regulator unit to the passage downstream from the valve unit.

40 Claims, 6 Drawing Figures

PROPELLANT STORAGE CONSTRUCTION, PARTS THEREFOR AND METHODS OF MAKING THE SAME

BACKGROUND OF THE INVENTION

1. Field of the Invention

This invention relates to an improved propellant storage construction, an improved adapter and an improved pressure regulator unit therefor as well as to methods of making the propellant storage construction, the adapter and the pressure regulator unit therefor.

2. Prior Art Statement

It is known from the U.S. Pat. No. 3,762,431, to Wilson et al., to provide a propellant storage construction having a chamber for storing the propellant in a passage defining means leading to the chamber and containing a valve unit therein for opening and closing the passage defining means, the construction having a removable pressure regulating unit interconnected thereto and being operatively associated with the valve unit for operating the valve unit in relation to the pressure of the propellant having passed through the valve unit. For example, see FIG. 3 of the U.S. Pat. No. 3,762,431, to Wilson et al., wherein the pressure regulator unit 53 is threaded on an externally threaded part 102 of the container 54 having a passage defining means 71 carrying a valve unit in the passage thereof.

Also see the co-pending patent application, Ser. No. 326,703 filed Dec. 2, 1981, (Robertshaw Controls Company) wherein a pressure regulator unit is threaded to an externally threaded end of an adapter that has the passage passing therethrough and containing a valve unit therein, the adapter having its other end threaded into a threaded opening in a propellant storage container.

It was suggested to the inventors by others that it would be desirable to have a pressure regulator unit fastened to a supporting structure and have a propellant storage container be provided with an adapter that could quickly connect to the pressure regulator unit or be disconnected therefrom with the container being held in an inverted position on the pressure regulator unit.

SUMMARY OF THE INVENTION

It is one feature of this invention to provide an improved propellant storage construction wherein the propellant storage construction can be readily interconnected to and disconnected from a regulator unit.

In particular, it was found according to the teachings of this invention that one of the passage defining means for a propellant storage construction and a regulator unit for the propellant storage construction could be provided with a generally conical seat and that other of the passage defining means and the pressure regulator unit can be provided with a generally conical nose-like member to be received in the seat to fluidly interconnect the pressure regulator unit to the passage defining means in an effective and rapid manner.

For example, one embodiment of this invention provides a propellant storage construction having a chamber for storing the propellant and a passage defining means leading to the chamber and containing a valve unit therein for opening and closing the passage defining means, the construction having a removable pressure regulator unit interconnected thereto and being operatively associated with the valve unit for operating the valve unit in relation to the pressure of the propellant having passed through the valve unit. One of the passage defining means and the pressure regulator unit defines a generally conical seat adjacent the valve unit and on the side thereof opposite to the chamber and the other of the passage defining means and the pressure regulator unit has a generally conical nose-like member received in the seat to fluidly interconnect the pressure regulator unit to the passage defining means downstream from the valve unit.

Accordingly, it is an object of this invention to provide an improved propellant storage construction having one or more of the novel features of this invention as set forth above or hereinafter shown or described.

Another object of this invention is to provide a method of making such a propellant storage construction, the method of this invention having one or more of the novel features of this invention as set forth above or hereinafter shown or described.

Another object of this invention is to provide an improved adapter for such a propellant storage construction, the adapter of this invention having one or more of the novel features of this invention as set forth above or hereinafter shown or described.

Another object of this invention is to provide a method of making such an adapter, the method of this invention having one or more of the novel features of this invention as set forth above or hereinafter shown or described.

Another object of this invention is to provide an improved pressure regulator unit for such a propellant storage construction, the pressure regulator unit for this invention having one or more of the novel features of this invention as set forth above or hereinafter shown or described.

Another object of this invention is to provide a method of making such a pressure regulator unit, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
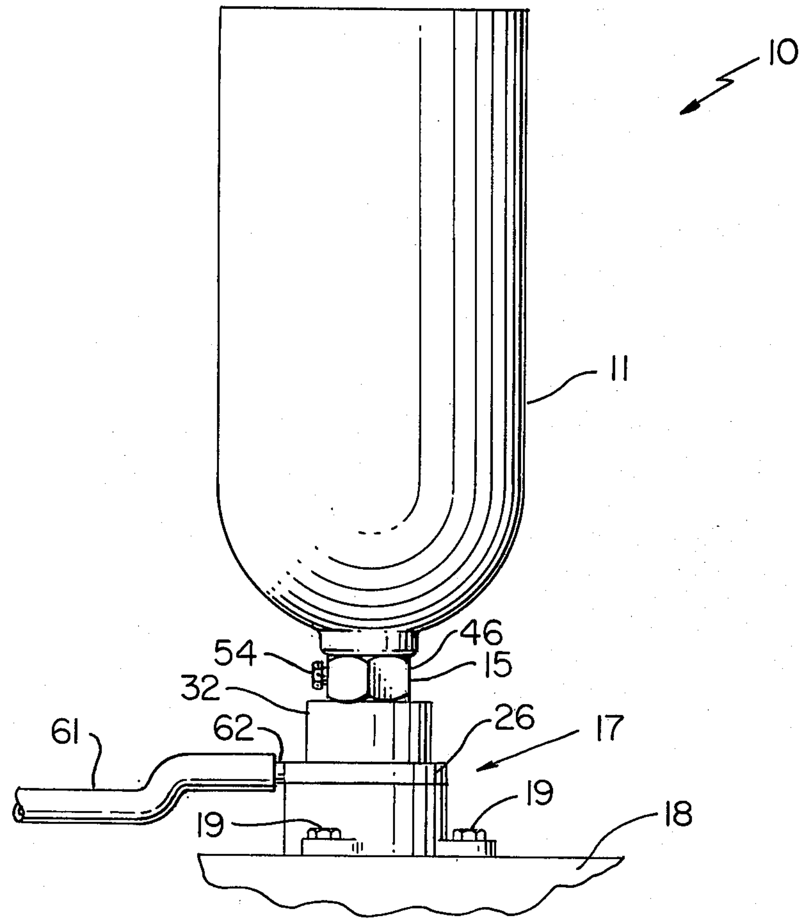
FIG. 1 is a fragmentary side view of the improved propellant storage construction of this invention.

While the various features of this invention are hereinafter described and illustrated as being particularly adapted to provide a propellant storage construction wherein the propellant is gaseous $CO_2$ for carbonating beverages and the like, it is to be understood that the various features of this invention can be utilized singly or in any combination thereof to provide means for dispensing other types of propellants for other purposes as desired.

Therefore, this invention is not to be limited to only the embodiments illustrated in the drawings, because the drawings are merely utilized to illustrate one of the wide variety of uses of this invention.

Figure 2:
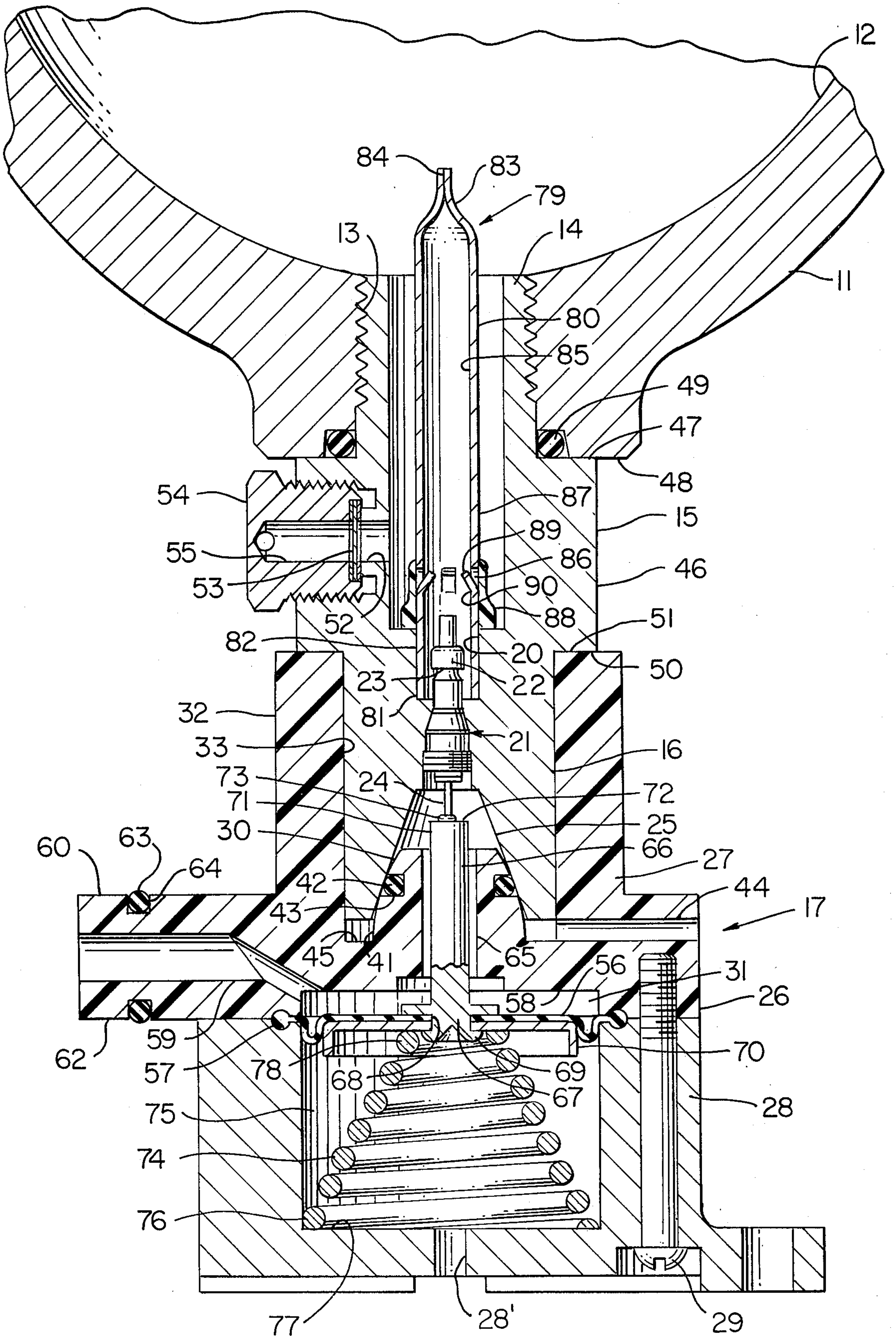
FIG. 2 is an enlarged fragmentary cross-sectional view of the propellant storage construction of FIG. 1.
Figure 3:
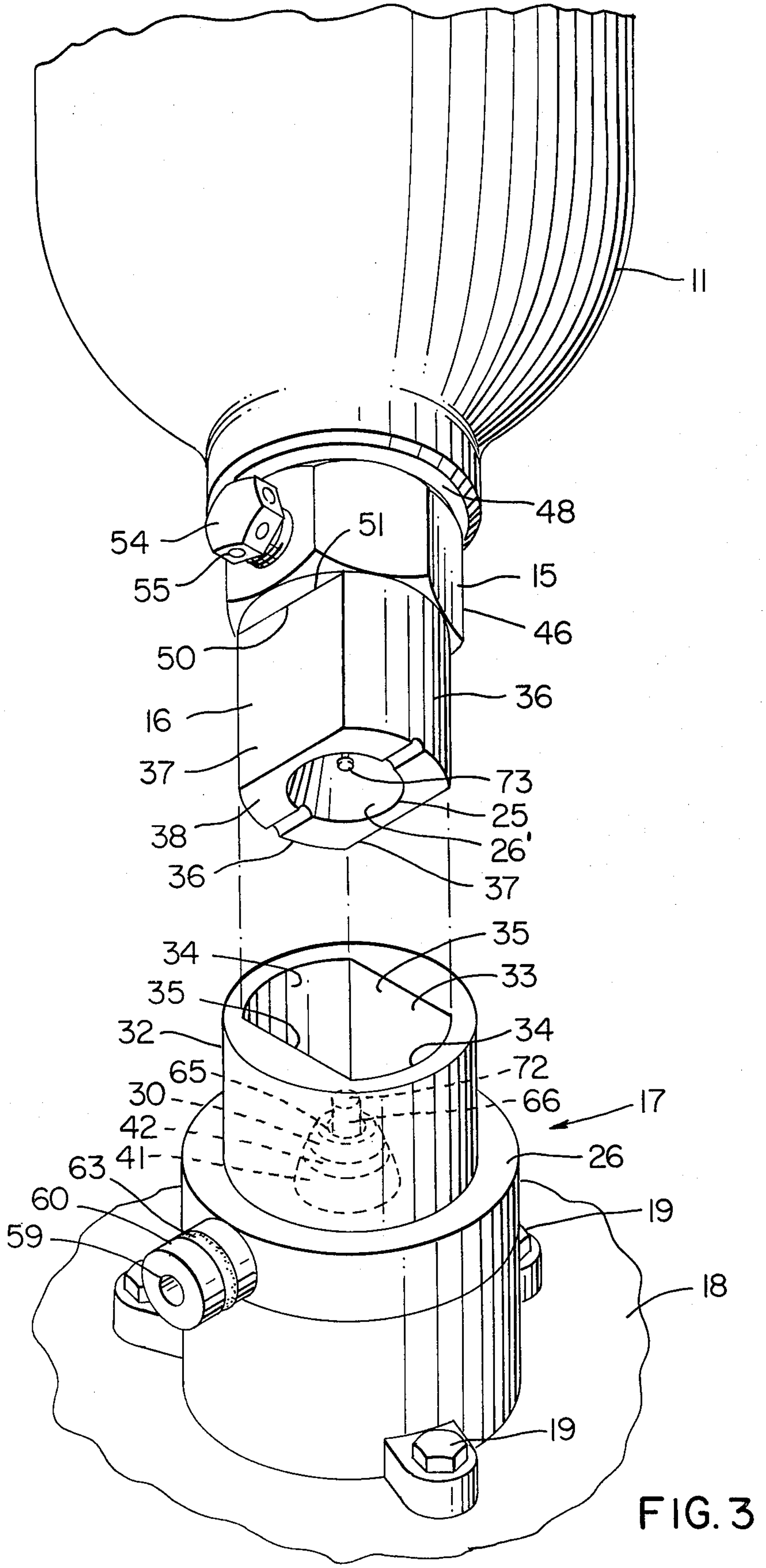
FIG. 3 is an exploded perspective view illustrating one step in the method of this invention for making the propellant storage construction of FIG. 1.

Referring now to FIGS. 1, 2 and 3, the improved propellant storage construction of this invention is generally indicated by reference numeral 10 and comprises a metallic container 11 having a chamber 12 therein for the storage of a suitable propellant, such as $CO_2$ for carbonating beverages and the like, and having an outlet opening 13 threadedly receiving a threaded end 14 of a metallic adapter or passage defining means 15 that has its other end 16 detachably secured to a pressure regulator unit that is generally indicated by the reference numeral 17 and is illustrated in FIG. 1 as being secured to a suitable supporting structure 18 by threaded fastening members 19.

The adapter 15 has a stepped passage 20 passing through the opposed ends 14 and 16 thereof and containing a valve unit 21 therein of the tire-type that has a valve member 22 for opening and closing a valve seat 23 under the control of an axially movable plunger 24 in a manner well known in the art. For example, see the aforementioned U.S. Pat. No. 3,762,431 to Wilson et al. and such U.S. patent is being incorporated into this disclosure by this reference thereto.

The stepped passage 20 defines a generally conical seat 25 that has a substantially straight line sidewall 26' when viewed in cross section as illustrated in FIG. 2.

The pressure regulator unit 17 has a housing means 26 formed from housing members 27 and 28 secured together by fastening means 29 with the housing member 27 defining a generally conical nose-like member 30 adapted to be received in the seat 25 of the adapter 15 in the manner illustrated in FIG. 2 to fluidly interconnect the passage 20 of the adapter 15 with an output chamber 31 of the pressure regulator unit 17 formed in a manner hereinafter set forth.

While the housing member 27 of the pressure regulator unit 17 is formed of plastic material and the housing member 28 is formed of metallic material, it is to be understood that other suitable materials can be utilized, if desired.

Also while the adapter 15 is illustrated and described as having the conical seat 25 and the pressure regulator unit 17 is illustrated and described as having the conical nose-like member 30, it is to be understood that the adapter 15 could have the nose-like member 30 and the regulator unit 17 could have the seat 25, if desired.

The housing member 27 of the pressure regulator unit 17 has a tubular portion 32 spaced from and surrounding the nose-like member 30, the tubular portion 32 having an opening 33 therein that is provided with opposed arcuate sidewalls 34 and substantially flat opposed sidewalls 35 to respectively cooperate with a pair of opposed arcuate sidewalls 36 and a pair of opposed flat sidewalls 37 on a projecting portion 38 of the adapter 15 which defines the end 16 thereof.

In this manner, when the inverted container 11 and its adapter 15 are inserted downwardly into the fastened down pressure regulator unit 17 so that the projecting portion 38 of the adapter 15 will be received in the tubular portion 32 of the housing means 17, the opening 33 in the tubular portion 32 guides the end 16 of the adapter 15 in such a manner that the conical seat 25 is telescoped over the conical nose-like member 30 of the pressure regulator unit 17 to fluidly interconnect the same together while the tubular portion 32 and projecting portion 38 function to interconnect the pressure regulator unit 17 to the adapter 15 and, thus, to the container 11 in the manner illustrated in FIG. 1.

It may be found that just the weight of the container 11 and adapter 15 in the inverted position illustrated in FIG. 2 will be sufficient to hold the parts together, particularly if the container 11 is supported either at its top or sidewalls while in the condition illustrated in FIG. 1.

However, it may be found desirable to provide a quick connect-disconnect between the tubular portion 32 of the pressure regulator unit 17 and the projecting portion 38 of the adapter 15 such as can be accomplished by a simple rotational movement of the adapter 15 relative to the pressure regulator 17 after the adapter 15 has been fully received in the opening 33 of the pressure regulator unit 17.

Figure 4:
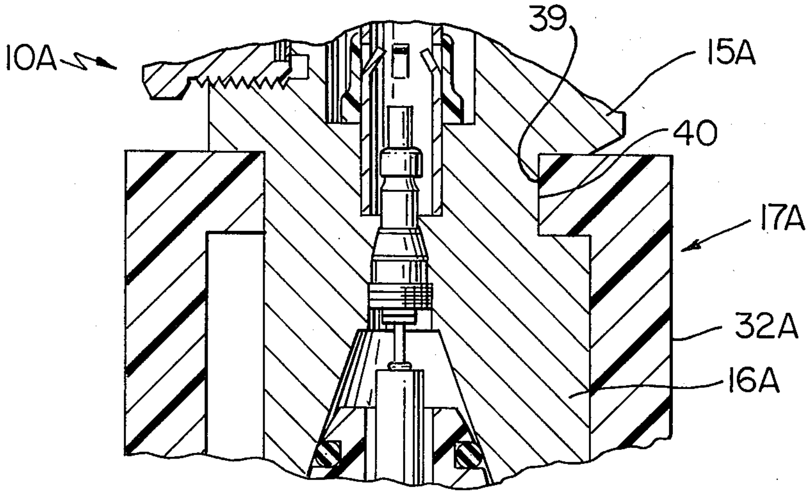
FIG. 4 is a fragmentary view similar to FIG. 2 and illustrates another embodiment of the propellant storage construction of this invention.

For example, see FIG. 4 wherein another propellant storage construction of this invention is generally indicated by the reference numeral 10A and parts thereof similar to the construction 10 previously described are indicated by the like reference numerals followed by the reference letter "A".

As illustrated in FIG. 4, it can be seen that the tubular portion 32A of the pressure regulator unit 17A has an inwardly turned flange means 39 adapted to be received in an annular groove 40 formed in the end 16A of the adapter 15A when the same are rotated to the position illustrated in FIG. 4. When it is desired to unfasten the adapter 15A from the pressure regulator unit 17A, the adapter 15A is rotated to clear the flange 39 of the pressure regulator unit 17A from the groove 40 of the adapter 15A so that the adapter 15A can be lifted vertically upwardly from the pressure regulator unit 17A in the same manner that the adapter 15 of the propellant storage construction 10 of FIG. 2 can be lifted vertically upwardly from the pressure regulator unit 17 to disconnect the adapter 15 from the pressure regulator unit 17.

The nose-like member 30 of the pressure regulator unit 17 has a sidewall means 41 that is substantially arcuate when viewed in cross section as illustrated in FIG. 2 and has the convex side thereof facing the seat 25 so that the conical nose-like member 30 permits the seat 25 to slightly swivel thereon as the seat 25 is being seated on the sidewall means 41 of the conical nose-like member 30 so as to insure that an annular resilient sealing member 42 carried in an annular groove 43 formed in the nose-like member 30 will fully seal against the sidewall means 26' of the seat 25 completely around the same as the adapter 15 is being fully inserted into the opening 33 of the pressure regulator unit 17 as illustrated in FIG. 2. Thus, this arrangement allows for slight misalignment between the nose-like member 30 and conical seat 25 while still providing full sealing therebetween.

The tubular portion 32 of the housing member 27 of the pressure regulator unit 17 has a passage 44 that leads to the exterior thereof and is in communication with the opening 33 adjacent the bottom wall 45 thereof to not only prevent a dash-pot effect as the end 16 of the adapter 15 is being inserted into the opening 33, but also to permit any grit or the like on the nose-like member 30 to be blown out of the opening 33 as will be apparent hereinafter.

The adapter 15 has an intermediate portion 46 that has a substantially hexagonal configuration as illustrated in FIG. 3 to readily permit standard tools to grasp the same so that the threaded end 14 thereof can be threaded into the threaded opening 13 of the container 11 until a shoulder 47 of the intermediate portion 46 of the adapter 15 bottoms out against an annular shoulder 48 of the container 11, a suitable O-ring sealing member 49 being utilized to seal the surfaces 47 and 48 together.

Also, an annular shoulder 50 defined by the intermediate portion 46 of the adapter 15 can abut against an annular shoulder 51 on the outer end of the tubular portion 32 of the housing member 27 when the conical seat 25 has fully sealed against the annular O-ring 42 of the nose-like member 30 as illustrated in FIG. 2. In this manner, the shoulder 51 will take the full weight of the container 11 and adapter 15 and thereby prevent such full weight from being imposed on the nose-like member 30 of the pressure regulator unit 17.

The intermediate portion 46 of the adapter 15 has a cross opening 52 interconnected to the passage 20 upstream of the valve unit 21 so as to be disposed in fluid communication with the storage chamber 12. In this manner, a conventional rupture or fracture disk 53 can be held in the opening 52 by a threaded retainer 54 so that should the pressure in the chamber 12 exceed a safe level, the same will fracture the disk 53 and be expelled out of an opening means 55 in the retainer 54 in a manner well known in the art.

The pressure regulator unit 17 has a flexible diaphragm 56 provided with an outer peripheral portion 57 held between the housing members 27 and 28 in a manner to cooperate with a wall means 58 of the housing member 27 to define the output chamber 31, the output chamber 31 being interconnected by a passage 59 to a nipple extension 60 of the housing member 27 that is adapted to have a conduit means 61, FIG. 1, slip onto the outer peripheral surface 62 thereof and be sealed thereto by an annular O-ring sealing member 63 carried in an annular groove 64 in the nipple extension 60 in a manner well known in the art.

In addition, the output chamber 31 is interconnected by an opening 65 formed centrally through the nose-like member 30 so as to be fluidly interconnected to the valve unit 21 when the adapter 15 is interconnected to the pressure regulator unit 17 as illustrated in FIG. 2.

The diaphragm 56 carries a plunger 66 which has one end 67 fastened together an opening 68 in a flexible diaphragm 56 by being turned over at 69 against a cup-shaped diaphragm backup plate 70 while the other end 71 thereof projects loosely through the opening 65 in the conical nose-like member 30 to have its flat end surface 72 abut against the end 73 of the plunger 24 of the valve unit 21 so that movement of the diaphragm 57 controls movement of the plunger 24 of the valve unit 21 and, thus, the opening and closing of the valve unit 21 in a manner well known in the pressure regulator art.

A compression spring 74 is disposed in a vented chamber 75 of the housing member 28 and has one end 76 bearing against an internal shoulder 77 of the housing member 28 and the other end 78 thereof bearing against the diaphragm backup plate 70 so that the force of the compression spring 74 tends to move the plunger 66 in a direction to open the valve unit 21, the housing member 28 having a vent opening 28′ to interconnect the chamber 75 to the atmosphere.

However, when the adapter 15 is not disposed in the tubular member 32 of the pressure regulator unit 17, the force of the compression spring 74 causes the diaphragm 56 to bottom out against the wall 58 whereby the diaphragm 56 will remain against the wall 58 until the projection 38 of the adapter 15 is inserted down into the opening 33 of the tubular portion 32 of the pressure regulator construction 17 in a manner hereinafter set forth.

In order to prevent ice particles and the like from the storage chamber 12 from reaching the valve unit 21 of the adapter 15, a flow restricting tube means that is generally indicated by the reference numeral 79 in FIG. 2 is utilized, the flow restricting tube means 79 and its function being fully disclosed in the U.S. Pat. No. 3,245,583, to Miller et al., and such U.S. patent to Miller et al. is being incorporated into this disclosure by this reference thereto.

The flow restricting tube means 79 comprises a substantially cylindrical metallic tube 80 having one end 81 press fitted or otherwise secured in a cylindrical section 82 of the passage 20 so as to surround the valve seat 23 of the valve unit 21, the other end 83 of the tube 80 being suitably crimped to provide a small flow opening 84 therein. In this manner, only gaseous propellant is adapted to pass through the restricting opening 84 in the end 83 of the tube 80 to flow through the internal passage 85 thereof and reach the valve seat 23 of the valve unit 21 so that only gaseous propellant will pass out to the valve seat 23 through the valve unit 21 when the same is opened by the plunger 24 in a manner hereinafter set forth.

However, it was found according to the teachings of this invention, that it is desired to charge the chamber 12 of the container 11 through the valve unit 21 but that such a small opening 84 in the flow restricting means 79 would impede such a filling operation.

Therefore, it was found according to the teachings of this invention that suitable opening means 86 could be provided in the sidewall means 87 of the tube 80 and be covered by a flexible sleeve 88 of rubber or the like telescoped onto the tube 80 and having suitable slit means therein aligned with the opening means 86 which will spread open when a charge of propellant is being forced through the valve unit 21 in a direction toward the chamber 12. In particular, the pressure differential acting across the slits in the sleeve 88 adjacent the opening means 86 will open such slits so that the propellant will flow through the opening means 86 and slits in the resilient sleeve 88 to reach the chamber 12 in a rapid manner that cannot be provided by the crimped end 83 of the tube 80, such slitted sleeve 88 being similar to a slitted sleeve illustrated and described in the aforementioned U.S. Pat. No. 3,245,583 to Miller et al., and being utilized for another purpose.

While the openings 86 in the sidewall means 87 of the tube 80 can be formed in any suitable manner, the same are formed by carrying substantially integral rectangular tabs 89 in the sidewall means 87 of the tube 80 and bending such tabs 89 inwardly about their integral hinged ends 90 so that the resulting carved through areas of the sidewall means 87 will form the opening means 86 in a relatively simple manner.

Therefore, it can be seen that it is relatively simple methods of this invention to form the improved adapter 15 and the improved pressure regulator 17 of this invention to cooperate together to form the improved propellant storage construction 10 of this invention to be operated in a manner now to be described.

When it is desired to interconnect a container 11 and its adapter 15 to the mounted pressure regulator unit 17, the projecting portion 38 of the adapter 15 is telescoped downwardly into the opening 33 of the tubular portion 32 of the pressure regulator unit 17 and before the conical seat 25 of the projecting portion 38 seats against the conical nose-like member 30, the plunger 24 of the valve member 21 makes contact with the flat end surface 72 of the plunger 71 because the compression spring 74 is holding the diaphragm 56 against the wall 58 of the housing member 27 so that the plunger 24 is moved inwardly relative to the valve unit 21 as the adapter 15 is moving downwardly into the pressure regulating unit 17. Thus, the valve member 22 of the valve unit 21 is moved away from the valve seat 23 so that a flow of propellant from the chamber 12 is adapted to pass through the opened valve unit 21 and blow any grit or adverse material off of the conical seat 25 and the nose-like member 30 and out of the passage 44. However, such exiting of the propellant out of the passage 44 is only temporary because the conical seat 25 then makes contact with the annular sealing member 42 on the nose-like member 30 to completely seal the valve unit 21 from the passage 44 so that the valve unit 21 is only now interconnected to the opening 65 passing through the nose-like member 30 and, thus, to the output chamber 31 of the pressure regulator unit.

Once the adapter 15 has its seat 25 seated on the nose-like member 30 of the pressure regulator unit 17, the valve unit 21 remains in an open condition so that propellant from the storage chamber 12 passes to the output chamber 31 and tends to create a pressure differential acting across the diaphragm 56 in a manner to move the diaphragm 56 in opposition to the force of the compression spring 74. Thus, once the pressure in the output chamber 31 exceeds a certain value, the diaphragm 56 is then moved downwardly in FIG. 2 a sufficient distance to cause the plunger 24 of the valve unit 21 to close the valve member 22 against the valve seat 23 to terminate the flow of propellant in the storage chamber 12 to the output chamber 31.

However, when the conduit 61 is drawing off propellant from the output chamber 31 for any desired use thereof, the drop in pressure in the chamber 31 causes the compression spring 74 to move the diaphragm 56 upwardly to again open the valve unit 21 so that the pressure regulator unit 17 will continuously supply propellant to the output chamber 31 and, thus, to the conduit 61 at a reduced pressure value from the pressure of the propellant in the chamber 12 in a manner well known in the pressure regulator art.

As previously stated, during the flow of propellant through the open valve unit 21 to the output chamber 31, the crimped end 83 of the flow restricting tube means 79 prevents any ice crystals from reaching the valve unit 21 from the storage chamber 12 so that the valve unit 21 will not ice up in an adverse condition that would tend to cause the same to remain in an open condition for reasons fully set forth in the aforementioned U.S. Pat. No. 3,245,583 to Miller et al.

Should it be desired to replace a storage container 11 from the pressure regulator unit 17, it can be seen that all that is required is to have the operator lift the storage container 11 out of the tubular portion 32 of the pressure regulator unit 17 and replace a new container 11 and its adapter 15 in place thereof in the manner previously described so that the used container 11 can be transported to a desired location and be recharged with propellant through the valve unit 21.

In particular, as previously stated, when a charge of propellant is being fed through the valve unit 21 in a direction toward the chamber 12, such propellant will flow through the opening means 86 in the flow restricting tube means 79 and spread apart the slits in the covering resilient sleeve 88 so that a full flow of propellant through the valve unit 21 into the chamber 12 can take place through the flow restricting tube means 79 of this invention. However, after the charging operation, the pressure differential now acting across the sleeve 88 closes the slits therein so that propellant from the chamber 12 cannot enter the tube 80 through the opening means 86.

Therefore, it can be seen that it is a relatively simple method of this invention to form the storage construction 10 of this invention from the adapter 15 of this invention and the pressure regulator unit 17 of this invention.

It may be found that it is desirable to form the plunger 66 of the pressure regulator unit 17 to also function as a pressure relief valve in a manner similar to the pressure regulator unit set forth in the U.S. Pat. No. 3,433,389, to Puster, such U.S. patent to Puster being incorporated in this disclosure by this reference thereto.

Figure 5:
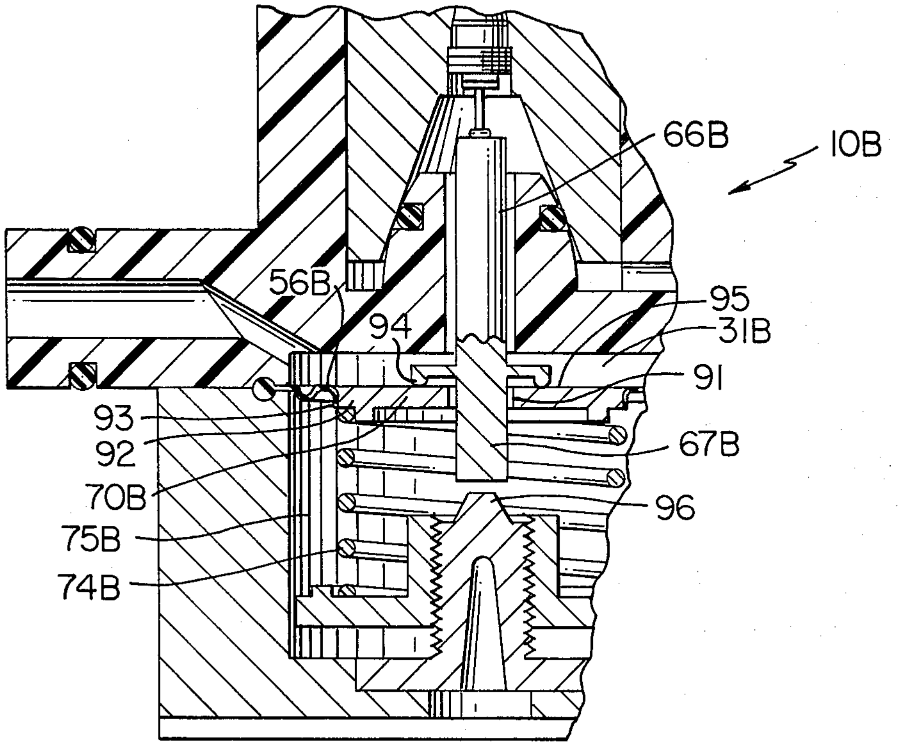
FIG. 5 is a fragmentary view similar to FIG. 2 and illustrates another embodiment of the propellant storage construction of this invention.

In particular, reference is now made to FIG. 5 wherein another propellant storage construction of this invention is generally indicated by the reference numeral 10B and parts thereof similar to the propellant storage construction 10 previously described are indicated by like reference numerals followed by the reference letter "B".

As illustrated in FIG. 5, the plunger 66B is not attached to the backup plate 70B of the diaphragm 56B but has its end 67B passing loosely through an opening 91 in the backup member 70B which has its outer periphery 92 secured to the inner periphery 93 of the flexible diaphragm 56B.

The plunger 66B has an annular integral valve member 94 formed thereon which is adapted to seat against the upper surface 95 of the backup member 70B so as to close the opening 91 thereof from the output chamber 31B. However, should the pressure in the output chamber 31B be sufficient to compress the compression spring 74B sufficiently so that the end 67B of the plunger 66B bottoms out against an adjustable stop 96 with the backup member 70B being moved further downwardly in FIG. 5 by the pressure in the output chamber 31B, the valve member 94 is now prevented by the stop 96 from following such further downward movement of the backup plate 70B so that the opening 91 is now interconnected to the output chamber 31B which can exit from the chamber 75 through suitable vent means (not shown).

Thus, once the pressure in the output chamber 31B falls below the predetermined output pressure, the compression spring 74B has moved the diaphragm 56B upwardly in FIG. 5 a distance sufficient to cause the surface 95 of the backup member 70B to engage against the valve member 94 of the plunger 66B and lift the same off of the stop 96 so that the opening 91 in the backup member 70B now remains closed as illustrated in FIG. 5.

It may also be found desirable to have the plunger 66 of the pressure regulator unit 17 previously described close off the opening 65 in the conical nose-like member 30 when the adapter 15 and its associated container 11 are removed from the pressure regulator unit 17.

Figure 6:
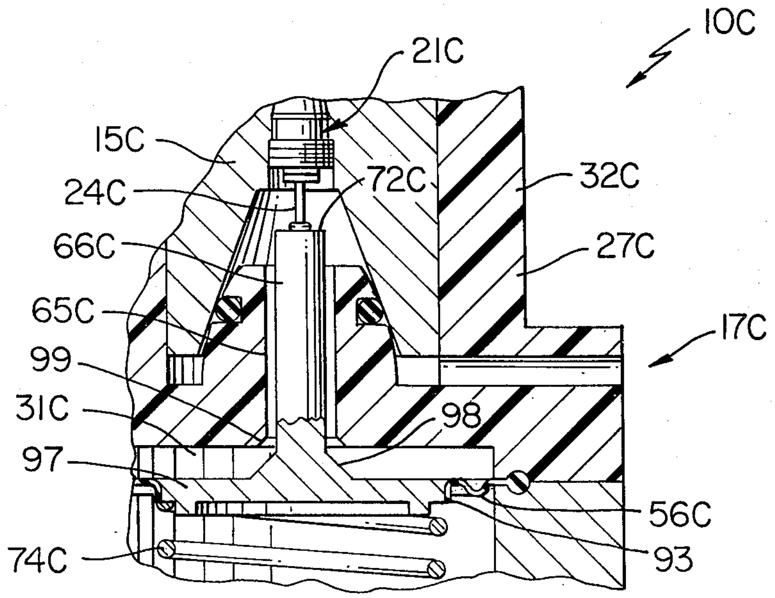
FIG. 6 is a view similar to FIG. 5 and illustrates another embodiment of the propellant storage construction of this invention.

For example, reference is now made to FIG. 6 wherein another propellant storage construction of this invention is generally indicated by the reference numeral 10C and parts thereof similar to the propellant storage construction 10 previously described are indicated by like reference numerals followed by the reference letter "C".

As illustrated in FIG. 6, it can be seen that the plunger 66C has an integral disc-like part 97 forming the end 67C thereof with the disc-like part 97 being secured to the outer peripheral part 93C of the diaphragm 56C to cooperate therewith in defining the output chamber 31C.

The plunger 66C has a frusto-conical portion 98 formed adjacent the disc-like part 97 thereof with the frusto-conical part 98 comprising a valve member adapted to seat against a frusto-conical valve seat 99 formed by the opening 65C of the housing member 27C.

In this manner, when the adapter 15C is removed from the tubular portion 32C of the housing member 27C in the manner previously described, the force of the compression spring 74C moves the diaphragm 56C upwardly until the frusto-conical valve member 98 of the plunger 66C fully seats against the frusto-conical valve seat 99 to stop the upward movement of the diaphragm 56C under the force of the compression spring 74C while at the same time closing the opening 65C from the output chamber 31C so that should any propellant be in the system downstream from the output chamber 31C, the same cannot exit through the opening 65C of the housing member 27C of the pressure regulator construction unit 17C when the adapter 15C and its associated container 11C are removed from the pressure regulator unit 17C.

However, when the adapter 15C is received in the tubular portion 32C of the housing member 27C in the manner illustrated in FIG. 6, the plunger 24C of the valve unit 21C engages against the flat surface 72C of the plunger 66C so as to cause opening of the valve unit 21C in the manner previously described to permit the propellant now passing through the open valve unit 21C to act on the frusto-conical portion 98 of the plunger 66C which is exposed to the passage 65C upstream from the valve seat 99 and force the valve portion 98 downwardly in opposition to the force of the compression spring 74C to thereby open the valve seat 99 as illustrated in FIG. 6.

Therefore, it can be seen that this invention not only provides an improved propellant storage construction and method of making the same, but also this invention provides an improved adapter and an improved pressure regulator unit for such a propellant storage construction and methods of making such an adapter and such a pressure regulator unit.

While the forms and methods of this invention now preferred have been illustrated and described as required by the Patent Statute, it is to be understood that other forms and method steps can be utilized and still fall within the scope of the appended claims.

What is claimed is:

1. In a propellant storage construction having a chamber for storing said propellant and a passage defining means leading to said chamber and containing a valve unit therein for opening and closing said passage defining means, said construction having a removable pressure regulator unit interconnected thereto and being operatively associated with said valve unit for operating said valve unit in relation to the pressure of said propellant having passed through said valve unit, the improvement wherein either said passage defining means or said pressure regulator unit defines a generally conical seat adjacent said valve unit and on the side thereof opposite to said chamber and the other thereof has a generally conical nose-like member received in said seat to fluidly interconnect said pressure regulator unit to said passage means on said side of said valve unit.

2. A propellant storage construction as set forth in claim 1 wherein sealing means is disposed between said seat and said nose-like member to seal the same together.

3. A propellant storage construction as set forth in claim 2 wherein said sealing means comprises an annular sealing member.

4. A propellant storage construction as set forth in claim 3 wherein said nose-like member has an annular groove therein receiving said annular sealing member therein.

5. A propellant storage construction as set forth in claim 1 wherein said nose-like member has side wall means provided with an arcuate cross-sectional configuration that has a convex side thereof facing said seat.

6. A propellant storage construction as set forth in claim 5 wherein said seat has side wall means provided with a substantially straight line cross-sectional configuration that faces said side wall means of said nose-like member.

7. A propellant storage construction as set forth in claim 1 wherein either said passage defining means or said pressure regulator unit has a tubular portion and the other thereof has a projecting portion disposed in said tubular portion to hold said pressure regulator unit to said passage defining means.

8. A propellant storage construction as set forth in claim 7 wherein said tubular portion and said projecting portion respectively have interlocking means interlocking with each other.

9. A propellant storage construction as set forth in claim 8 wherein said interlocking means interlock through rotational movement between said tubular portion and said projecting portion.

10. In a propellant storage construction having a chamber for storing said propellant and a passage defining means leading to said chamber and containing a valve unit therein for opening and closing said passage defining means, said construction having a removable pressure regulator unit interconnected thereto and being operatively associated with said valve unit for operating said valve unit in relation to the pressure of said propellant having passed through said valve unit, the improvement wherein either said passage defining means or said pressure regulator unit defines a generally conical seat adjacent said valve unit and on the side thereof opposite to said chamber and the other thereof has a generally conical nose-like member received in said seat to fluidly interconnect said pressure regulator unit to said passage means on said side of said valve unit, either said passage defining means or said pressure regulator unit having a tubular portion and the other thereof having a projecting portion disposed in said tubular portion to hold said pressure regulator unit to said passage defining means, said passage defining means comprising an adapter having opposed ends with a passage extending between and through said ends, said valve unit being disposed in said passage intermediate said ends, said chamber being defined by a container having an opening therein receiving one of said ends of said adapter to fluidly interconnect said chamber with said passage, the other of said ends having either said seat or said nose-like member.

11. A propellant storage construction as set forth in claim 1 wherein said passage defining means has flow restricting means intermediate said chamber and said valve unit to restrict the flow of said propellant from said chamber to said valve unit.

12. In a propellant storage construction having a chamber for storing said propellant and a passage defining means leading to said chamber and containing a valve unit therein for opening and closing said passage defining means, said construction having a removable pressure regulator unit interconnected thereto and being operatively associated with said valve unit for operating said valve unit in relation to the pressure of said propellant having passed through said valve unit, the improvement wherein either said passage defining means or said pressure regulator unit defines a generally conical seat adjacent said valve unit and on the side thereof opposite to said chamber and the other thereof has a generally conical nose-like member received in said seat to fluidly interconnect said pressure regulator unit to said passage means on said side of said valve unit, said passage defining means having flow restricting means intermediate said chamber and said valve unit to restrict the flow of said propellant from said chamber to said valve unit, said flow restricting means having means to permit full flow therethrough when a charge of said propellant is being fed through said valve unit and said flow restricting means to said chamber to fill said chamber with said propellant.

13. A propellant storage construction as set forth in claim 12 wherein said flow restricting means comprises a tube having opposed ends, one end of said tube being interconnected to said passage defining means, the other end of siad tube projecting into said chamber and having means restricting propellant flow into the same.

14. A propellant storage construction as set forth in claim 13 wherein said means of said flow restricting means for permitting full flow therethrough being located intermediate said ends of said tube.

15. A propellant storage construction as set forth in claim 14 wherein said means of said flow restricting means for permitting full flow therethrough comprises opening means in said tube intermediate said ends thereof and a resilient sleeve disposed on said tube and covering said opening means, said sleeve having slit means aligned with said opening means, said sleeve normally maintaining said slit means in a closed condition thereof to prevent propellant from said chamber from entering said tube through said slit means.

16. In an adapter for a propellant storage construction having a chamber for storing said propellant, said adapter having a passage means leading to said chamber and containing a valve unit therein for opening and closing said passage defining means, said construction having a removable pressure regulator unit adapted to be interconnected thereto and be operatively associated with said valve unit for operating said valve unit in relation to the pressure of said propellant having passed through said valve unit, the improvement wherein said adapter defines a generally conical seat adjacent said valve unit and on the side thereof opposite to said chamber whereby said pressure regulator unit is adapted to have a generally conical nose-like member received in said seat to fluidly interconnect said pressure regulator unit to passage means on said side of said valve unit.

17. An adapter for a propellant storage construction as set forth in claim 16 wherein said seat has side wall means provided with a substantially straight line cross-sectional configuration that is adapted to face side wall means of said nose-like member.

18. An adapter for a propellant storage construction as set forth in claim 16 wherein said adapter has a projecting portion adapted to be disposed into a tubular portion of said pressure regulator unit to hold said pressure regulator unit to said adapter.

19. An adapter for a propellant storage construction as set forth in claim 18 wherein said projecting portion has interlocking means adapted to interlock with interlocking means of said tubular portion.

20. An adapter for a propellant storage construction as set forth in claim 19 wherein said interlocking means interlock through rotational movement between said tubular portion and said projecting portion.

21. An adapter for a propellant storage construction as set forth in claim 16 wherein said adapter has opposed ends with said passage means extending between and through said ends, said valve unit being disposed in said passage intermediate said ends, one of said ends of said adapter being adapted to fluidly interconnect said chamber with said passage means, the other of said ends having said seat thereon.

22. An adapter for a propellant storage construction as set forth in claim 16 wherein said passage means has flow restricting means adapted to be intermediate said chamber and said valve unit to restrict the flow of said propellant from said chamber to said valve unit.

23. An adapter for a propellant storage construction as set forth in claim 22 wherein said flow restricting means has means to permit full flow therethrough when a charge of said propellant is being fed through said valve unit and said flow restricting means to said chamber to fill said chamber with said propellant.

24. An adapter for a propellant storage construction as set forth in claim 23 wherein said flow restriction means comprises a tube having opposed ends, one end of said tube being interconnected to said passage defining means, the other end of said tube being adapted to project into said chamber and having means restricting propellant flow into the same.

25. An adapter for a propellant storage construction as set forth in claim 24 wherein said means of said flow restricting means for permitting full flow therethrough is located intermediate said ends of said tube.

26. An adapter for a propellant storage construction as set forth in claim 25 wherein said means of said flow restricting means for permitting full flow therethrough comprises opening means in said tube intermediate said ends thereof and a resilient sleeve disposed on said tube and covering said opening means, said sleeve having slit means aligned with said opening means, said sleeve normally maintaining said slit means in a closed condition thereof to prevent propellant from said chamber entering said tube through said slit means.

27. In a pressure regulator unit for a propellant storage construction having a chamber for storing said propellant and a passage defining means leading to said chamber and containing a valve unit therein for opening and closing said passage defining means, said pressure regulator unit being adapted to be interconnected to said passage defining means and be operatively associated with said valve unit for operating said valve unit in relation to the pressure of said propellant having passed through said valve unit, the improvement wherein said pressure regulator unit has a generally conical nose-like member adapted to be received in a generally conical seat of said passage defining means that is adjacent said valve unit and on the side thereof opposite to said chamber to fluidly interconnect said pressure regulator unit to said passage means on said side of said valve unit.

28. A pressure regulator unit for a propellant storage construction as set forth in claim 27 and including sealing means adapted to be disposed between said seat and said nose-like member to seal the same together.

29. A pressure regulator unit for a propellant storage construction as set forth in claim 28 wherein said sealing means comprises an annular sealing member.

30. A pressure regulator unit for a propellant storage construction as set forth in claim 29 wherein said nose-like member has an annular groove therein receiving said annular sealing member therein.

31. A pressure regulator unit for a propellant storage construction as set forth in claim 27 wherein said nose-like member has side wall means provided with an arcuate cross-sectional configuration that has a convex side thereof adapted to face said seat.

32. A pressure regulator unit for a propellant storage construction as set forth in claim 27 wherein said pressure regulator unit has a tubular portion adapted to receive a projecting portion of said passage defining means therein to hold said pressure regulator unit to said passage defining means.

33. A pressure regulator unit for a propellant storage construction as set forth in claim 32 wherein said tubular portion has interlocking means adapted to interlock with interlocking means of said pressure defining means.

34. A pressure regulator unit for a propellant storage construction as set forth in claim 33 wherein said interlocking means interlock through rotational movement between said tubular portion and said projecting portion.

35. A pressure regulator unit for a propellant storage construction as set forth in claim 27 wherein said nose-like member has an opening passing therethrough, said unit having a movable wall spaced from said nose-like member, and a plunger operatively interconnected to said wall and projecting through said opening is said nose-like member to be adapted to engage said valve unit of said passage defining means.

36. A pressure regulator unit for a propellant storage construction as set forth in claim 35 wherein said plunger has relief valve means for relieving pressure.

37. A pressure regulator unit for a propellant storage construction as set forth in claim 35 wherein said plunger has check valve means for closing said opening in said nose-like member.

38. In a method of making a propellant storage construction having a chamber for storing said propellant and a passage defining means leading to said chamber and containing a valve unit therein for opening and closing said passage defining means, said construction having a removable pressure regulator unit interconnected thereto and being operatively associated with said valve unit for operating said valve unit in relation to the pressure of said propellant having passed through said valve unit, the improvement comprising the steps of forming either said passage defining means or said pressure regulator unit to define a generally conical seat adjacent said valve unit and on the side thereof opposite to said chamber and the other thereof to have a generally conical nose-like member, and disposing said nose-like member in said seat to fluidly interconnect said pressure regulator unit to said passage means on said side of said valve unit.

39. In a method of making an adapter for a propellant storage construction having a chamber for storing said propellant, said adapter having a passage means leading to said chamber and containing a valve unit therein for opening and closing said passage defining means, said construction having a removable pressure regulator unit adapted to be interconnected thereto and be operatively associated with said valve unit for operating said valve unit in relation to the pressure of said propellant having passed through said valve unit, the improvement comprising the step of forming said adapter to define a generally conical seat adjacent said valve unit and on the side thereof opposite to said chamber whereby said pressure regulator unit is adapted to have a generally conical nose-like member received in said seat to fluidly interconnect said pressure regulator unit to said passage means on said side of said valve unit.

40. In a method of making a pressure regulator unit for a propellant storage construction having a chamber for storing said propellant and a passage defining means leading to said chamber and containing a valve unit therein for opening and closing said passage defining means, said pressure regulator unit being adapted to be interconnected to said passage defining means and be operatively associated with said valve unit for operating said valve unit in relation to the pressure of said propellent having passed through said valve unit, the improvement comprising the step of forming said pressure regulator unit to have a generally conical nose-like member adapted to be received in a generally conical seat of said passage defining means that is disposed adjacent said valve unit and on the side thereof opposite to said chamber to fluidly interconnect said pressure regulator unit to said passage means on said side of said valve unit.

* * * * *